Oct. 23, 1923.
W. W. VOSPER
1,471,872
PIPE CUTTING APPARATUS
Filed Dec. 31, 1921
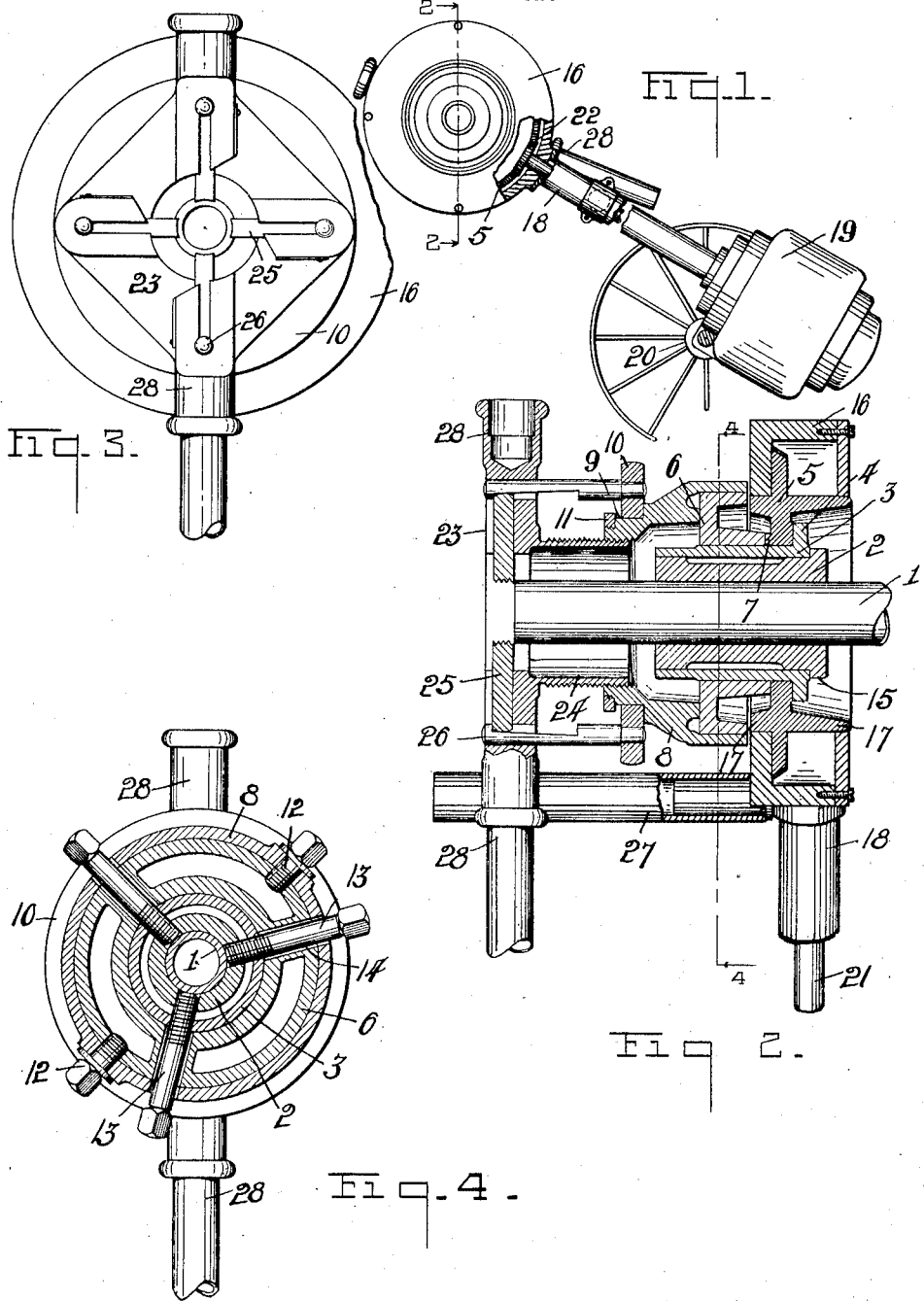
INVENTOR.
William W. Vosper
By Owen Owen & Crampton
Attys Patented Oct. 23, 1923.

1,471,872

UNITED STATES PATENT OFFICE.

WILLIAM W. VOSPER, OF TOLEDO, OHIO, ASSIGNOR TO THE TOLEDO PIPE THREADING MACHINE COMPANY, OF TOLEDO, OHIO, A CORPORATION OF OHIO.

PIPE-CUTTING APPARATUS.

Application filed December 31, 1921. Serial No. 526,130.

*To all whom it may concern:*

Be it known that I, WILLIAM W. VOSPER, a citizen of the United States, and a resident of Toledo, county of Lucas, and State of Ohio, have made an Invention Appertaining to a Pipe-Cutting Apparatus; and I do hereby declare the following to be a full, clear, and exact description of the invention, such as will enable others skilled in the art to which it appertains to make and use the same, reference being had to the accompanying drawings, and to the characters of reference marked thereon, which form a part of this specificaton.

This invention relates to pipe threading and cutting-off machines, and particularly to those of the power driven type in which the work is rotated and the chaser carrying head is held against turning.

The object of my invention is the provision of a simple and efficient apparatus of the class described, which is strong and durable in its construction, powerful in its action and capable of being easily engaged to or removed from a work piece, whereby to enhance the practicability and commercial value of the apparatus.

A further object of the invention is the provision of an apparatus of the class described which is permanently connected to its power unit and is easily portable from place to place.

The invention is fully described in the following specification, and while, in its broader aspect, it is capable of embodiment in numerous forms, a preferred embodiment thereof is illustrated in the accompanying drawings, in which,—

Figure 1 is a rear elevation of a unit embodying the invention with parts broken away. Fig. 2 is a cross-section on the line 2—2 in Fig. 1, with parts broken away and with the die-head hands turned in vertical position. Fig. 3 is a front elevation of the pipe receiving and holding means with a threading head in connection therewith and with parts broken away, and Fig. 4 is a section on the line 4—4 in Fig. 2.

Referring to the drawings, 1 designates a pipe or other cylindrical work piece, 2 a work centering sleeve mounted thereon, and 3 a bearing sleeve mounted on the sleeve 2 and having an annular flange 4 at one end. A bevel gear 5 is mounted on the sleeve 3 and is held thereon by the flange 4 and collar 6 mounted on the sleeve. The collar is in toothed engagement with the gear 5, as shown at 7, to cause a positive driving of one by the other. A shell or housing 8 is mounted on the collar 6 and projects forward therefrom, being provided at its forward end with an annular bearing 9 on which a collar 10 is mounted for free turning movements, being loosely held thereon by a nut 11 threaded on the forward end of the housing.

One or more screws 12 are threaded into the housing 8 and collar 6 to rigidly connect the same, and a plurality of work clamping screws 13, in the present instance three in number, are extended through registering openings 14 in the shell 8 and collar 6 and threaded at their inner end portions through the sleeve 3 and projected through registering openings in the sleeve 2 in position to have clamping engagement at their inner ends with a pipe or work piece 1, as shown in Fig. 4. The screws 13 retain the sleeves 2 and 3 and collar 6 in assembled relation and may be withdrawn from engagement with the inner sleeve 2 when it is desired to remove such sleeve from the sleeve 3 to substitute therefor a sleeve 2 having a work receiving opening of different size. The sleeve 2 has a stop flange 15 at its outer end for coaction with the adjacent end of the sleeve 3.

The gear 5 is enclosed by a housing 16 of annular internally channeled form which rests at its internal side edges on annular flanges 17 projecting from opposite sides of the gear 5, the gear being thus permitted to have a free turning movement in the housing. A tubular shell 18 rigidly projects from the housing 16 at one side of its axis and connects to the housing of a motor 19, which is mounted for portable movements on a truck 20. The shaft 21 of the motor extends through the shell 18 and carries a bevel-gear 22 within the housing 16 in mesh with the gear 5.

A pipe threading head 23 has a tubular part 24 projecting from its inner side and provided with an external lead thread for threading into the outer end of the housing 8 in axial register with the work 1. The head 23 carries a plurality of radially movable thread cutting chasers 25 for threading engagement at their inner ends with the work piece 1, as well understood in the art, and the outer ends of the chasers bear against the inner tapered sides of the pins 26 for projecting from the collar 10 through openings in the head 23 at the outer end of the respective chasers. It is thus evident that an outward turning of the head 23 relative to the housing will cause the chasers to move outward along the tapered surfaces of the pins 26 and to thereby be gradually adjusted to cut a tapered thread, as is well understood in the art. Nothing new is claimed for the particular thread cutting unit employed. An arm 27 projects forward from the housing 16 in position to engage one of the arms 28 of the head 23 to hold the head against turning during a turning of the work 1 in thread cutting engagement with the chasers 25. The arm 27 may be removed to permit a hand turning of the cutter head 23 if desired.

It is evident in the use of an apparatus embodying my invention that when a work piece 1 is inserted within a centering sleeve 2 and fixedly secured against turning relative thereto by a tightening of the set screws 13, the motor may then be started to effect a driving of the gear 5, which in turn drives the collar 6 with which it has clutch engagement and this collar drives the housing 8 and also the sleeves 2 and 3 through the screws 12 and 13. While the cutter-head 23 is held against turning by the arm 27, the lead screw on the part 24 is caused to thread into the housing 8 to gradually move the chasers axially of the work as the cutting progresses, and at the same time the chasers are permitted to move radially outward by reason of the movement of the same along the tapered pins 26. The housing 16 provides a carrying means for the unit and at the same time encloses the gears 5 and 22.

I wish it understood that my invention is not limited to any specific construction, arrangement or form of the parts as it is capable of embodiment in numerous forms without departing from the spirit of the claims.

Having thus described my invention, what I claim as new, and desire to secure by Letters Patent, is,—

1. In combination, in an apparatus of the class described, a housing, a gear having a bearing in the housing, a pipe centering and holding means carried by and rotatable with the gear, pipe cutting means rotatably carried by said first means in work engaging relation, means for driving the gear, and means for holding the cutting means against rotation with the means driven by the gear.

2. In combination, in an apparatus of the class described, a gear, a housing mounted on and enclosing the gear, work holding and centering means engaged and driven by the gear and having an extension at one end, a tapered thread cutting unit carried by the extension for turning movements relative thereto, means connecting the housing and unit to prevent a relative turning thereof, and power means connected to the housing and having driving connection with the gear.

3. In combination, in an apparatus of the class described, a bearing sleeve, a work centering sleeve mounted on the bearing sleeve and axially removable therefrom, a gear mounted on the bearing sleeve, a collar mounted on the bearing sleeve in positive clutch engagement with the gear, a housing mounted on the collar and projecting forward therefrom, work clamping means extending through the housing, collar and sleeves to prevent relative turning thereof, a second housing mounted on and enclosing the gear and having an extension therefrom, a motor connected to the extension and having its drive shaft extending therethrough and into the housing, a gear on the drive shaft in engagement with the first gear, a tapered thread cutting unit carried by the first housing for relative rotation and operable to cut a tapered thread on a work piece when the housing and unit are relatively turned and an arm projecting from the second housing for engagement with the thread cutting unit to hold it against turning relative to the second housing.

In testimony whereof I have hereunto signed my name to this specification.

WILLIAM W. VOSPER.